May 20, 1952 A. E. CLARK 2,597,619
TOOL MOUNT
Filed Sept. 30, 1947 2 SHEETS—SHEET 1
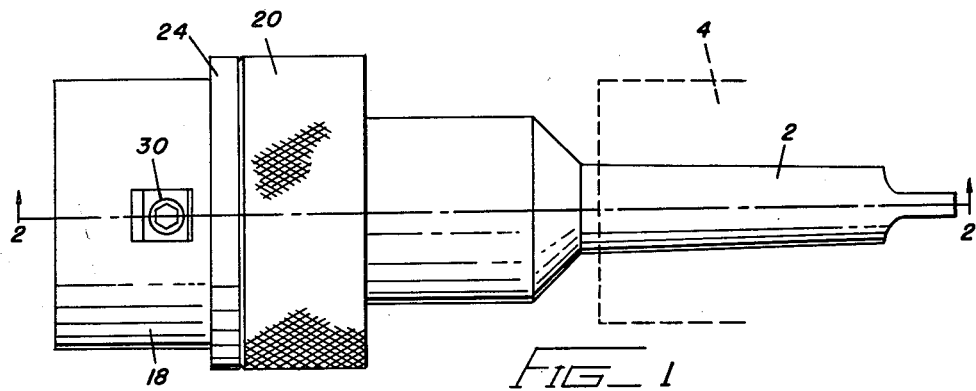
FIG_1
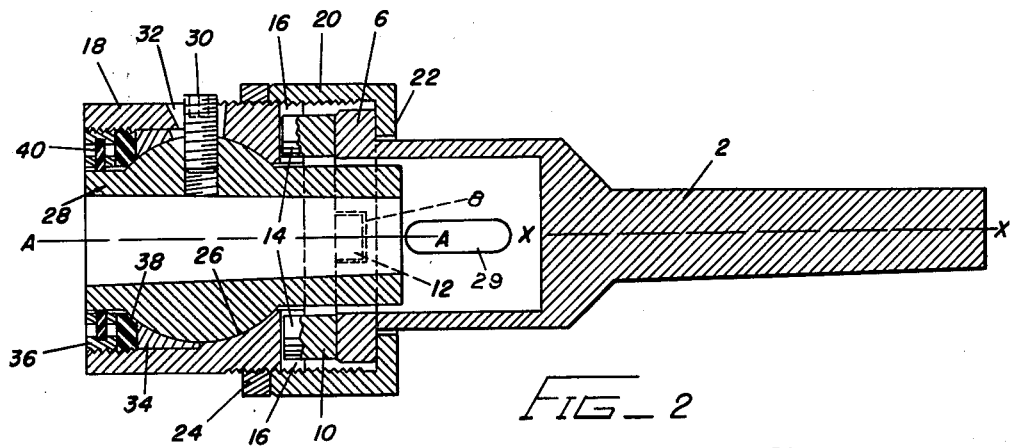
FIG_2
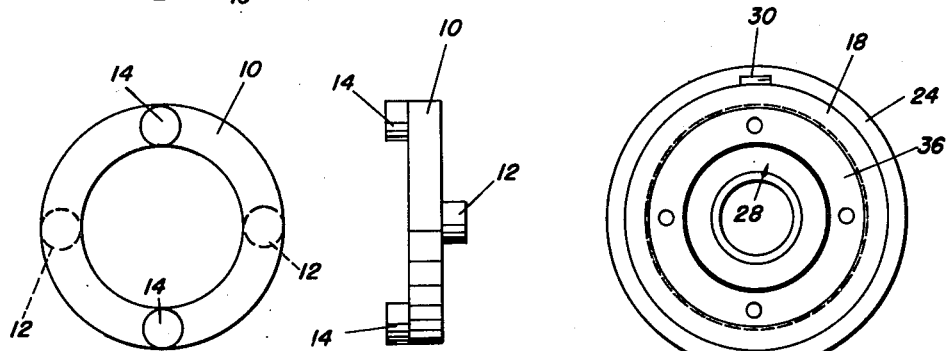
FIG_4  FIG_5  FIG_3
INVENTOR.
ARTHUR EDWIN CLARK
BY
Hauke, Hardesty & Schmidt
ATTORNEYS.

May 20, 1952   A. E. CLARK   2,597,619
TOOL MOUNT
Filed Sept. 30, 1947   2 SHEETS—SHEET 2
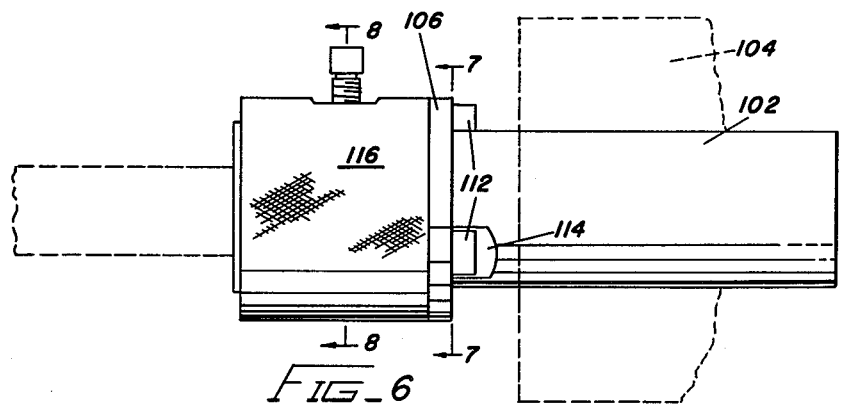
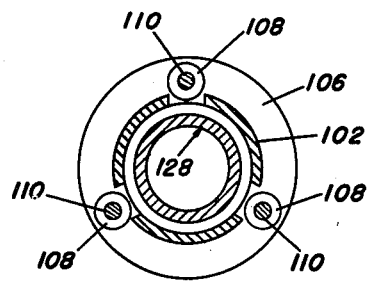
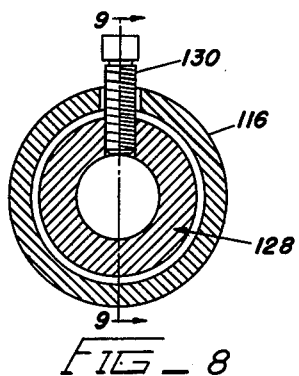
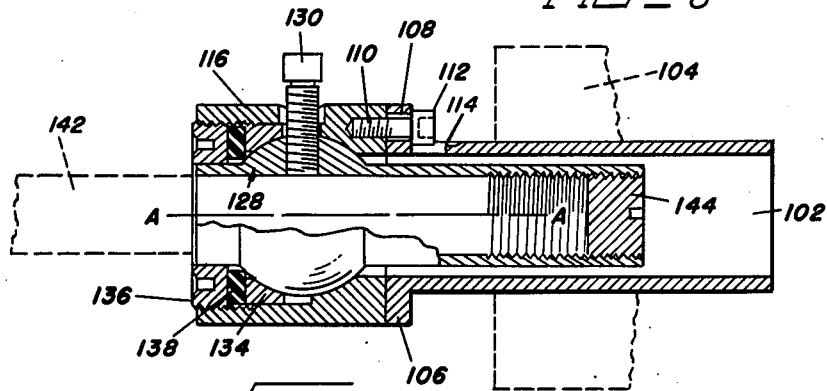
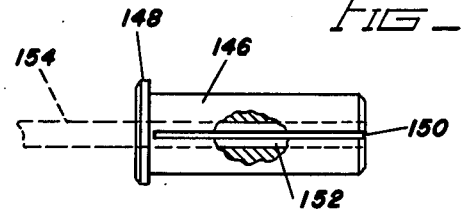
INVENTOR.
ARTHUR EDWIN CLARK
BY
Hauke, Hardesty & Schmidt
ATTORNEYS.

Patented May 20, 1952

2,597,619

UNITED STATES PATENT OFFICE 2,597,619

TOOL MOUNT

Arthur Edwin Clark, Ferndale, Mich.

Application September 30, 1947, Serial No. 776,991

10 Claims. (Cl. 29—96)

This invention relates to a tool mount.

In the machining of various materials, it is often desirable to have the cutting tool oriented with a certain center line. In some applications, as in lathes, that part of the machine which holds the cutting tool become so worn that proper alignment of the tool becomes difficult or very nearly impossible.

It is an object of this invention to provide a cutting tool mount which permits adjustment of the tool in its mount even though the mount itself be not adjustable in its holding device on the machine. This and other objects are accomplished in a cutting tool mount which incorporates a ball-and-socket joint to give limited universal adjustment of the cutting tool, and which also permits adjustment of the cutting tool in a plane which is generally transverse of the principal axis of the tool.

In the drawings:

Fig. 1 is a top plan view of a tool mount made according to the invention.

Fig. 2 is a view in section substantially on line 2—2 of Fig. 1.

Fig. 3 is a front elevation view of the tool mount of Figs. 1 and 2.

Fig. 4 is a view of one face of the drive member of the tool mount shown in Figs. 1 and 2.

Fig. 5 is an edge view of the drive member.

Fig. 6 is a side elevation view of another embodiment of the invention.

Fig. 7 is a view in section substantially on line 7—7 of Fig. 6.

Fig 8 is a view in section substantially on line 8—8 of Fig. 6.

Fig. 9 is a view in section on line 9—9 of Fig. 8, and

Fig. 10 is a detail view of an additional element which may be used in certain applications of the invention.

Referring now particularly to the embodiment shown in Figs. 1-5 inclusive, a support 2 is shown as being held by any suitable machine tool holding device indicated in dotted lines at 4. The device 4 may be the tail stock of a lathe, or it may be the turret of a turret-head lathe, or it may be part of a screw-machine, or the like. In the embodiment shown in Figs. 1-5, the support 2 is shown as having a tapered shank, but it will be understood that any other suitable shape may be provided for the support.

Support 2 is provided with a flange 6 in the face of which there is a groove or grooves 8. A drive member 10 adjacent the face of flange 6 is provided with tongues 12 which cooperate with the groove or grooves to make the drive member 10 nonrotatable relatively to support 2 but movable relatively thereto along an axis which is substantially transverse of the axis X—X of support 2. Drive member 10 is provided with other tongues 14 which engage groove or grooves 16 in the adjacent face of a body member 18.

As is best seen in Figs. 4 and 5, the tongues 12 and 14 lie in planes which are substantially perpendicular. Consequently, body member 18 has limited movement relatively to the drive member 10 along the axis substantially transverse of the axis of relative movement of support 2 and drive member 10.

Body member 18 is carried by support 2 by means of a flanged and threaded sleeve 20. Flange 22 of sleeve 20 bears against flange 6 and holds the support, the drive member, and the body member together. A lock nut 24 is provided on the body member 18 in order to secure the sleeve 20 against loosening.

The inside of body member 18 is provided with a spherical shoulder 26. The spherical shoulder 26 serves as part of the socket of a ball-and-socket joint, the ball being the substantially spherical exterior of the tool holder 28. The tool holder 28 shown in Fig. 2 is tapered to receive the tapered shank of any suitable lathe tool. It will of course be understood that the opening in the tool holder may be cylindrical, and that a tool in that case may be secured in the tool holder by means of a set screw 30. Where the tool holder is tapered as shown in Fig. 2, the set screw 30 extending into opening 32 in the body member serves to hold the tool holder 28 against rotation relatively to body member 18.

As was pointed out above, the spherical shoulder 26 inside the body member 18 forms a portion of the socket of a ball-and-socket joint. The remainder of the socket is formed by the spherical spacer 34. Spacer 34 is held in engagement with the ball of the tool holder 28 by means of a nut 36 and a resilient washer 38. The nut 36 is preferably provided with a resilient washer insert 40. Washer 40 serves to keep foreign matter such as chips and dirt out of the tool mount.

Referrring now in detail to the embodiment shown in Figs. 6-9 inclusive, a support 102 is shown as being held by any suitable machine tool holding device indicated in dotted lines at 104. As in Fig. 1, the device 104 may be the tail stock of a lathe, or the turret of a turret-head lathe, part of a screw-machine, or the like. The support 102 is provided with a flange 106. Flange 106 has openings 108 therein; as is best seen in Figs. 7 and 9, the openings 108 are larger than the threaded portions 110 of screws having heads 112. The heads 112 of the screws are larger than the holes 108. Support 102 is preferably cut away or recessed as shown at 114 to accommodate screw heads 112.

The threaded portions 110 of the screws engage and support a body member 116. The body member is hollow and is similar to the body member 18 of the embodiment shown in Figs. 1 and 2. Inasmuch as the rest of the tool mount is similar to the tool mount shown in the first embodiment, it will not be described in detail here.

It will suffice to point out here that the tool holder 128 of the second embodiment does not have a tapered hole, but instead has a cylindrical hole. In this case, screw 130 is used to hold the tool 142 secure in the holder.

The tail end of tool holder 128 is preferably threaded to receive a nut 144. In some applications, it will be desirable to provide such a nut which can be screwed up tight against the end of the tool 142 to prevent the rearward displacement of the tool in the holder.

Fig. 10 shows a collet 146 having a flanged head 148 and a body which is slotted as shown at 150. Collet 146 is preferably provided with a substantially central opening 152 which is adapted to receive a piece of rod stock shown in dotted lines at 154.

It will be evident to those skilled in the art that collet 146 is adapted to be held in place in tool holder 128. Set screw 130 may be tightened against the bifurcated body portion of the collet in order to clamp tightly any piece of rod stock 154 which may be held by a collet.

It will of course be understood that a cylindrical shank support 102 could be used with a tool holder such as shown at 28 of the first embodiment, or that a cylindrical hole tool holder 128 could be used in the embodiment shown in Fig. 2.

*Operation*

In operation, the support 2 or 102 is secured in place in the machine tool. With the tool held secure in the tool holder, the reference axis A—A of the tool holder and thereby the principal axis of the tool, are aligned in the same general direction. Any deviation from true alignment of the reference axis A—A with the axis of rotation of the work is corrected in the first embodiment by sliding of the two tongue and groove drive connections. As soon as the tool is properly aligned, sleeve 20 is tightened up, and lock nut 24 is jammed tight against sleeve 20.

In the embodiment shown in Figs. 6–9 inclusive, proper alignment is permitted by relative movement of flange 106 and body member 116 because of the fact that holes 108 are larger than the threaded portions 110 of the screws. As soon as the proper alignment is effected, heads 112 of the screws are turned to tighten the screws and secure the flange 106 tight against body member 116.

In many applications, it will be desirable to leave the sleeve 20 or the screws 112 a little loose, in order that the holder may be full-floating. Under those circumstances, the tool will automatically center itself for each use.

I claim:

1. In a tool mount, a support, a body member adjustably secured to the support, a substantially spherical shoulder in the body member, a tool holder, a substantially spherical portion on the tool holder in engagement with the shoulder in the body member, a bearing member having a substantially spherical recess in engagement with the spherical portion of the tool holder, and means to yieldingly and removably hold the bearing member in engagement with the spherical portion of the tool holder.

2. In a tool mount, a support having an axis which is oriented in the general direction of the axis of relative rotation of the work and the tool, a drive member adjacent the support and having limited movement relatively to the support along an axis substantially transverse of the first-named axis, and a body member carried on the support and engaging the drive member, the body member having limited movement relatively to the drive member along an axis substantially transverse of the axis of movement of the drive member and support.

3. In a tool mount, a support having an axis which is oriented in the general direction of the axis of relative rotation of the work and the tool, a body member mounted on the support and being adjustable on the support in a direction substantially transverse of the aforesaid axis, a concave substantially spherical shoulder in the body member, a tool holder having a substantially spherical portion in engagement with the spherical shoulder, a bearing member having a substantially spherical face in contact with the spherical portion on the tool holder, and means to removably hold the bearing member in contact with the spherical portion on the tool holder.

4. In a tool mount, a support having an axis which is oriented in the general direction of the axis of relative rotation of the work and the tool, a body member mounted on the support and being adjustable on the support in a direction substantially transverse of the aforesaid axis, a concave substantially spherical shoulder in the body member, a tool holder having a substantially spherical portion in engagement with the spherical shoulder, means to hold a tool in the tool member, a bearing member having a substantially spherical face in contact with the spherical portion on the tool holder, and means to removably hold the bearing member in contact with the spherical portion on the tool holder.

5. In a tool mount, a support having an axis which is oriented in the general direction of the axis of relative rotation of the work and the tool, a body member mounted on the support and being adjustable on the support in a direction substantially transverse of the aforesaid axis, a tool holder mounted in the body member and being universally adjustable relatively thereto, and means to removably hold the tool holder in operating position in the body member.

6. A support, a body member secured to the support and being adjustable in a given plane, a tool holder having a reference axis, and means to mount the tool holder in the body member with its reference axis generally transverse of the aforesaid plane, the tool holder having limited but universal adjustability in relation to the body member.

7. In a tool mount, a support, a body member adjustably secured to the support, an elongated hollow tool holder mounted in the body member, the tool holder being universally adjustable in the body member, screw means to secure a tool in the tool holder, and additional means to hold the tool against endwise displacement in the tool holder.

8. In a tool mount, a support having an axis which is oriented in the general direction of the axis of relative rotation of the work and the tool, a body member mounted on the support and being adjustable on the support in a direction substantially transverse of the aforesaid axis, a tool holder mounted in the body member and being universally adjustable relatively thereto, means to removably hold the tool holder in operating position in the body member, screw means to removably hold the tool in the tool holder, the last named means being rotatable about an axis which is generally perpendicular to the first named axis, and additional screw means to positively hold the tool against displacement in the general direction of the first named axis.

9. A support, a body member secured to the support and being adjustable in a given plane, a holder having a reference axis, and means to mount the holder in the body member with its reference axis generally transverse of the aforesaid plane, the holder having limited but universal adjustability in relation to the body member.

10. A support, a body member secured to the support and being adjustable in a given plane, a holder having a reference axis, means to mount the holder in the body member with its reference axis generally transverse of the aforesaid plane, the holder having limited but universal adjustability in relation to the body member, and a collet removably secured in the holder.

ARTHUR EDWIN CLARK.

REFERENCES CITED

The following references are of record in the file of this patent:

UNITED STATES PATENTS

| Number | Name | Date |
|---|---|---|
| 1,923,847 | Seelbert | Aug. 22, 1933 |
| 2,051,954 | Leland | Aug. 25, 1936 |
| 2,231,511 | Scott | Feb. 11, 1941 |
| 2,277,290 | Bennett | Mar. 24, 1942 |
| 2,369,875 | Wanelik | Feb. 20, 1945 |
| 2,392,809 | Cote | Jan. 15, 1946 |
| 2,442,444 | Tautz | June 1, 1948 |